Patented May 1, 1923.

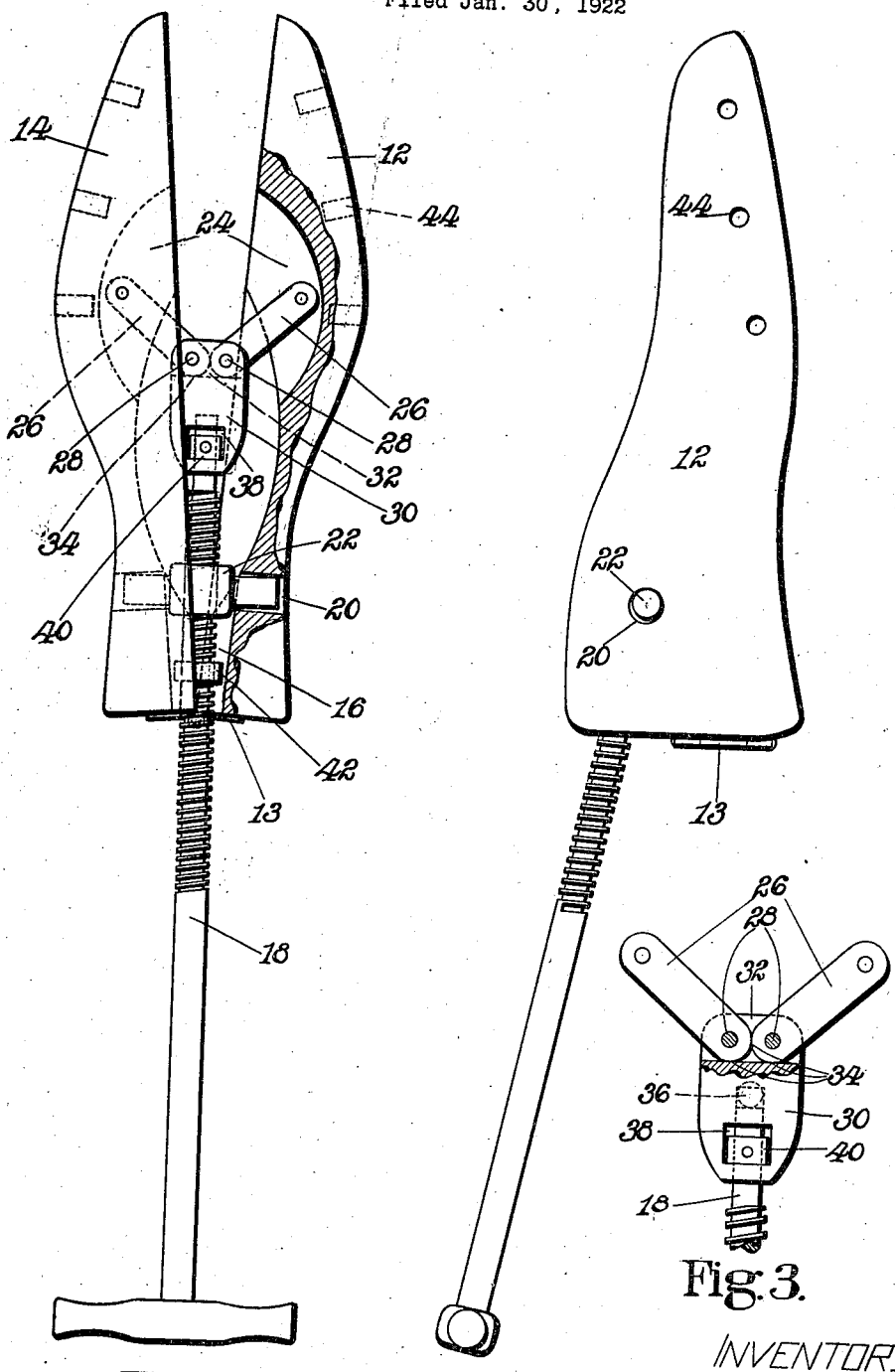

1,453,608

UNITED STATES PATENT OFFICE.

WILLIAM A. SPRAGUE, OF ISLINGTON, MASSACHUSETTS, ASSIGNOR TO UNITED SHOE MACHINERY CORPORATION, OF PATERSON, NEW JERSEY, A CORPORATION OF NEW JERSEY.

SHOE STRETCHER.

Application filed January 30, 1922. Serial No. 532,881.

*To all whom it may concern:*

Be it known that I, WILLIAM A. SPRAGUE, a citizen of the United States, residing at Islington, in the county of Norfolk and State of Massachusetts, have invented certain Improvements in Shoe Stretchers, of which the following description, in connection with the accompanying drawings, is a specification, like reference characters on the drawings indicating like parts in the several figures.

This invention relates to devices for stretching boots and shoes, and its object is to simplify and strengthen the construction, and render smooth and positive the operation of devices of this class. Great difficulty has been experienced with heretofore known stretchers in that the severe service to which they are subject causes excessive wear and ultimate breakage. The present invention provides a stretcher which is strong and positively and smoothly working.

The drawing illustrates a preferred form of stretcher selected for illustrative purposes.

Fig. 1 is a plan, partly broken away.

Fig. 2 is a side elevation, and

Fig. 3 is an enlarged detail.

The stretcher shown comprises a split foot-shaped member 12—14 formed to correspond with the forepart portion of a last. This member will generally not be formed as a right or left but may be so formed if desired. It may be turned in one piece in an ordinary last lathe, and split by a vertical central longitudinal saw cut.

The portions 12 and 14 thus formed are hinged together at their rear ends, by a hinge 13, in proper registration. Their inner flat faces are recessed at 16 to accommodate a screw 18, at 20 to accommodate a threaded, trunnioned block 22, and at 24 to receive pivotally the ends of toggle links 26. The inner ends of these links are shown as pivoted on pins 28 in a block 30, having a slot 32 in which the link ends are received and across which the pins 28 pass. The ends 34 of the links are circular and centered on the pins 28 which are spaced apart a distance equal to the sum of the two radii of the two link ends, which will thus roll on each other as they swing. The bottom of the slot 32 is spaced from the center of the pins a distance equal to the radius of the ends of the links, so that the circular portions bear on the bottom of the slot (see Fig. 3). This construction takes much of the strain of operation off the pins and puts it on the ends of the links and the block, which are of course much heavier in structure than the pins, and permits a lighter, cheaper construction of the pins and consequently of the block 30. A slight looseness may exist between the pins and the links, if desired, to facilitate smooth interaction between the links and the bottom of the slot. This feature is regarded as a valuable improvement, as it relieves the pins, which have been the weak part of many prior constructions, from much wear.

The block 30 is actuated by the screw 18, which is threaded in the block 22 and has its front end bearing in the block 30. This bearing is shown as a hardened ball 36. The block 30 is also slotted at 38 to receive a collar 40 pinned on the screw 18, to enable the screw positively to retract the block when it is screwed backward through the trunnioned block.

The thread on the screw 18 may be terminated at 42 or a collar may be pinned on the screw at this point to abut on the trunnioned block and prevent over-extension of the toggles.

The forepart is shown as bored at 44 to accommodate bunion buttons.

Having described my invention, what I claim as new and desire to secure by United States Letters Patent is:—

In a shoe stretcher, a split foot member, a toggle link connected to each part thereof and an operating block joining the inner ends of the toggle links, the block being slotted to receive the ends of the links in the same plane, and the ends of the links being circular to bear on each other and on the bottom of the slot in the block, pivot pins pivoting the toggle links to the operating block, said pins being spaced from the bottom of the slot at a distance substantially equal to the radius of the circular link ends, and having their centers substantially at the centers of the circles on which the link ends are formed, there being a slight looseness of the links on the pins to facilitate rolling of the link ends on each other, and positive interaction between the links and the bottom of the slot, an internally threaded member having trunnioned extensions engaging apertures in the foot member parts, and a threaded rod engaging the threads in said member for operating the block to spread or retract the toggle links.

In testimony whereof I have signed my name to this specification.

WILLIAM A. SPRAGUE.